United States Patent [19]

Snellman et al.

[11] 4,242,174

[45] Dec. 30, 1980

[54] SHEET BINDING SYSTEM

[76] Inventors: Donald L. Snellman, 2807 W. Galer, Seattle, Wash. 98199; Barry J. Lewis, 31511 41st Ave. S.W., Federal Way, Wash. 98003; Arthur G. Saunders, 19827 Maple Valley Hwy., Maple Valley, Wash. 98038; Wesley W. Hester, 1007 144th Pl. S.E., Bellevue, Wash. 98007

[21] Appl. No.: 961,565

[22] Filed: Nov. 17, 1978

[51] Int. Cl.³ ...................... B32B 31/00; B65H 37/00; B05C 1/00

[52] U.S. Cl. ................................ 156/563; 11/1 AD; 118/257; 156/578

[58] Field of Search ........... 156/578, 563, 559, 477 B; 270/58; 271/64, 73, 221; 281/23; 282/DIG. 2; 11/1 AD, 1 B; 118/257, 236, 237, 407, 410, 411, 413, 419

[56] References Cited

U.S. PATENT DOCUMENTS

| | | | |
|---|---|---|---|
| 1,528,935 | 3/1925 | MacDonald | 118/257 |
| 2,905,568 | 9/1959 | Burgeni | 118/257 |
| 3,383,263 | 5/1968 | Storti | 156/578 |
| 4,009,071 | 2/1977 | Snellman et al. | 156/563 |
| 4,116,750 | 9/1978 | Lewis et al. | 156/578 |

*Primary Examiner*—Michael W. Ball
*Attorney, Agent, or Firm*—Seed, Berry, Vernon & Baynham

[57] ABSTRACT

This invention relates to apparatus for binding collated or sorted sheets. More particularly, this invention relates to such apparatus for simultaneously binding multiple sets of collated or sorted sheets that have been assembled in a multiple-compartment sheet receiver.

9 Claims, 9 Drawing Figures

FIG. 6
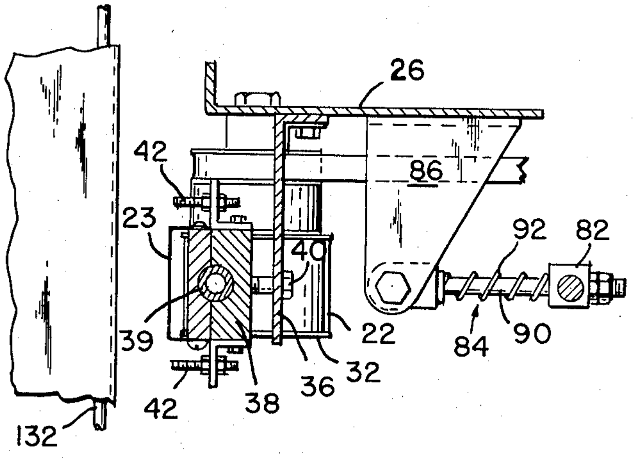
FIG. 7
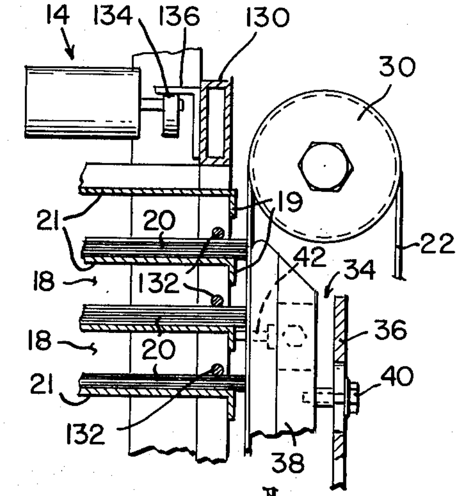
FIG. 8
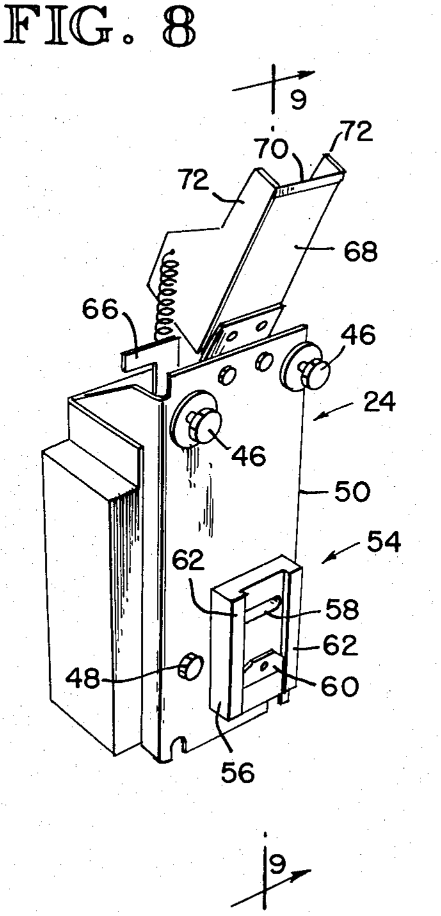
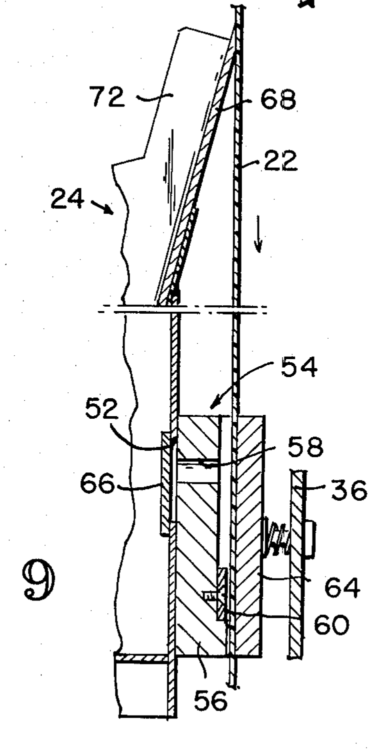
FIG. 9

SHEET BINDING SYSTEM

BACKGROUND OF THE INVENTION

The present invention constitutes an improvement over the apparatus described in U.S. Pat. No. 4,009,071. The apparatus described in that patent provides for in-line adhesive binding of sheets of paper that have been assembled in a multiple-compartment receiver. In the operation of that apparatus, sheets are distributed seriatim into a multi-compartmented vertically columned receiver, aligned to arrange their edges into common vertical planes so as to provide one or more aligned sets of sheets, clamped and adhesively edge-bound. The adhesive edge-binder apparatus of that patent includes an endless vertical belt and a hot melt glue dispenser arranged to deposit a strip of melted adhesive onto the endless belt, and to advance the melted adhesive strip into position adjacent the set or sets of exposed and aligned sheet edges, and to displace the melted adhesive-carrying endless belt into contact with the exposed and aligned sheet edges of one or more sheet sets to transfer the melted adhesive to such sets so as to edge bind those sets. The endless belt of the adhesive edge-binder apparatus of that patent is narrower than the sheet width and that apparatus includes a lateral shifting mechanism arranged to position and reposition endless belt laterally across the face of the sheet receiver to accomplish sheet binding at one or multiple selected locations.

SUMMARY OF THE INVENTION

The apparatus of the present invention represents an improvement over the unique adhesive edge-binder apparatus of the aforementioned patent. The present invention provides a remarkably efficient endless belt adhesive deposition-to-binding cycle that achieves a more esthetically-pleasing bound edge in a shorter time and with little or no air pollution. The apparatus that enables these achievements is of unique design. This apparatus can be assembled into the structure of the receiver, utilizing common mounting members, or it can be provided as a separate assemblage that could be, by way of example, mounted to a sheet receiver as an add-on feature that would convert a sorter or collator into a sorter-binder or collator-binder machine.

The adhesive edge-binder apparatus of this invention comprises an endless adhesive-carrying belt mounted for movement into a self-aligning binding position that enables adhesive transfer from the belt to the edges of aligned sheets of one or more sheet sets without the necessity of exactly calibrating the edge-binder to the sheet receiver. Furthermore, the edge-binder apparatus of this invention includes an indexing mechanism that enables incremental advancement of the endless adhesive-carrying belt to present additional portions of carried adhesive into position for transfer to the sheet edges without the necessity of advancing the belt through a complete revolution. The edge-binder apparatus of this invention also effects the deposition of a continuous strip of melted adhesive onto the endless belt such that the adhesive strip does not extend across the width of the endless belt and consequently does not migrate to the backside of the endless belt where it could foul the belt transporting mechanism.

BRIEF DESCRIPTION OF THE DRAWINGS

FIG. 6 is a cross-section view taken along the lines 6—6 of FIG. 5;

FIG. 7 is a partial cross-section view in elevation of the assembled and aligned sheet clamping mechanism of the present invention;

FIG. 8 is a perspective view of the frontside of the adhesive dispenser of the present invention; and FIG. 9 is a partial cross-section view in elevation taken along the line 9—9 of FIG. 8.

DETAILED DESCRIPTION OF THE DRAWINGS

Figure 1:
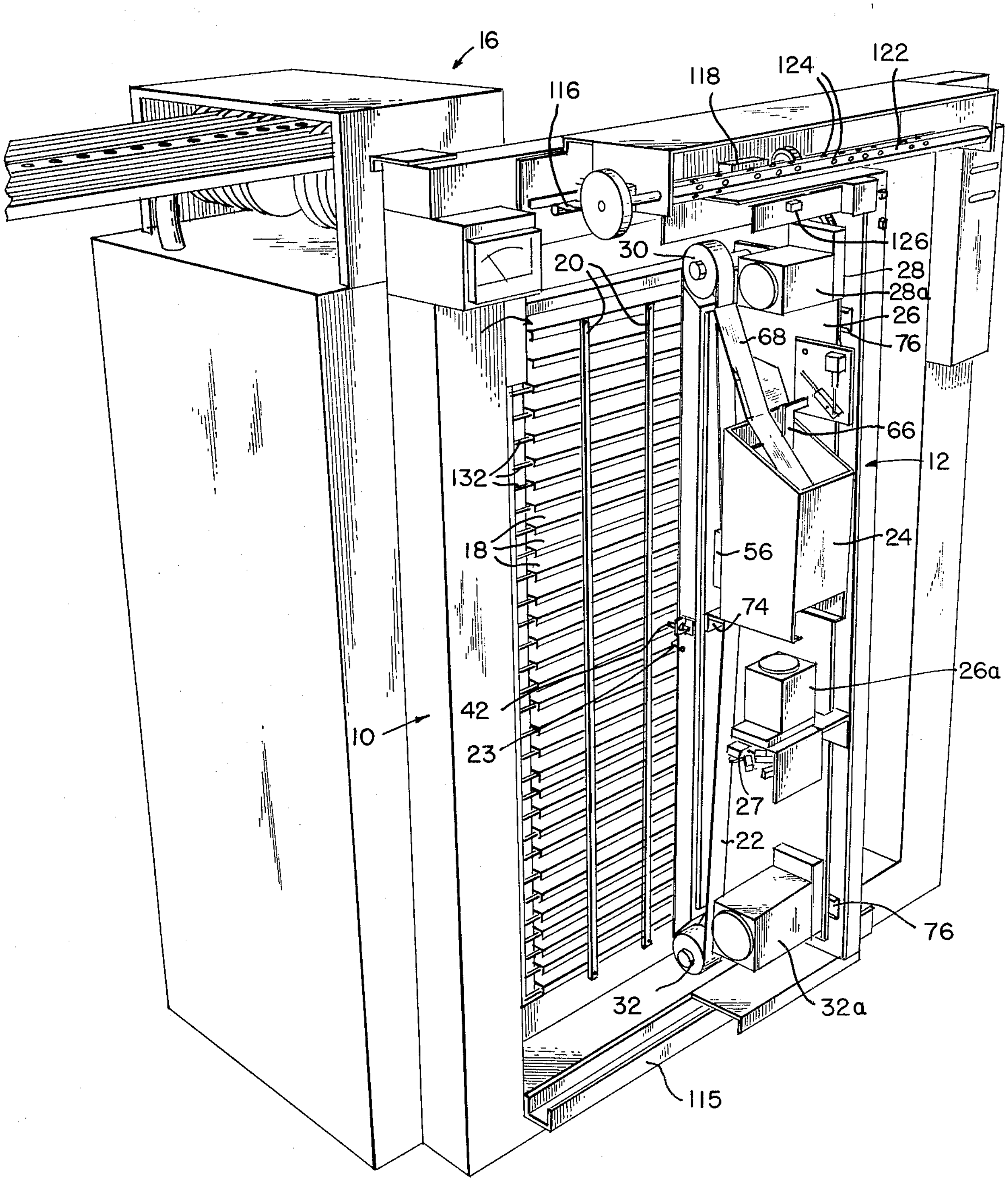
FIG. 1 is a perspective view of adhesive edge-binder of this invention mounted on a sheet receiver.

The adhesive edge-binder of this invention comprises a framework 10 which supports a binding mechanism 12 and an assembled and aligned sheet set edge clamping mechanism 14 (FIG. 7). The framework 10 may be a separate unit or part of a sheet receiver 16 or composed of members that are partly separate and partly integral with respect to a sheet receiver. The machine with which the adhesive edge-binder of this invention is designed to interact, be it a collator or sorter receiver or some other device, must constitute a plurality of sheet receiving compartments 18 within which sheet sets are positioned and aligned for simultaneous edge binding. Such a device could be of a design in which sheets are delivered seriatim and jogged into alignment such that the sheet edges of multiple sheet sets are aligned in common planes as would be the case in the receiver 16 of FIG. 1 wherein the to-be-bound edges of the sheets of each sheet set 20 (one sheet set per compartment 18) are aligned against vertically-oriented bars 20 so as to be coplanar.

The binding mechanism 12 comprises an endless belt 22 and an adhesive dispenser 24 mounted to a transfer frame 26. Transfer frame 26 is mounted to a carriage frame 28 that is supported by framework 10. Transfer frame 26 is mounted to shift belt 22 into and out of an edge-binding position. Carriage frame 28 is mounted to position belt 22 laterally across the faces of the sheet sets 20 so that edge binding can be accomplished at one or more selected locations.

Belt 22 is supported by an upper idler pulley 30 and a lower motor-driven pulley 32, the pulleys being journal-mounted to transfer frame 26. As thus supported, belt 22 has two runs; a frontside run which faces toward the sheet receiver 16 and a backside run which faces toward the adhesive dispenser 24. In between the two runs, a belt aligning assembly 34 is positioned and provides a backing surface for belt 22 on the frontside run.

Belt aligning assembly 34 comprises a mounting bracket 36 attached to transfer frame 26 and a belt aligning bar 38 mounted to bracket 36 by shoulder bolts 40. Shoulder bolts 40 space aligning bar 38 from bracket 36 as shown in FIG. 6 and extend through apertures in bracket 36 that are sufficiently large that the shoulder bolts may be rocked back and forth to some extent.

Three such shoulder bolts are provided, one at each end section of aligning bar 38 (e.g., as in FIG. 7) and one at the mid section of bar 38. One shoulder bolt preferably extends through a circular aperture in bracket 36 (e.g. as in FIG. 6) and the other two shoulder bolts preferably extend through slotted apertures in bracket 36 (e.g., as in FIG. 7). Also, belt aligning stops 42 (FIG. 6) are provided on opposite sides of the aligning bar 38 and extend beyond the frontside run of belt 22. Three such stops are provided, one at the mid section of bar 38 on one side and one at each end section of bar 38 on the other side (e.g., as in FIG. 2). Each aligning stop comprises a threaded stud secured to an angle bracket by opposed nuts, the angle bracket being attached to the aligning bar 38 as shown in FIG. 6.

Belt 22 is a non-metallic material, preferably Teflon-coated glass fabric such as manufactured by The Connecticut Hard Rubber Co. of New Haven, Conn., U.S.A. under the trademark Temp-R-Glas. A suitable belt has a width of 1.25 inches and has very low elongation characteristics in the application of the present invention.

Aligning bar 38, in addition to backing belt 22 along its frontside run, may be utilized as a heater element to maintain the frontside run of belt 22 at a preselected operating temperature. For this use, bar 38 could be fabricated from a pair of extruded aluminum channels with an electrical resistance heating element contained between the channels for even heat distribution to belt 22 along its frontside run.

Figure 2:
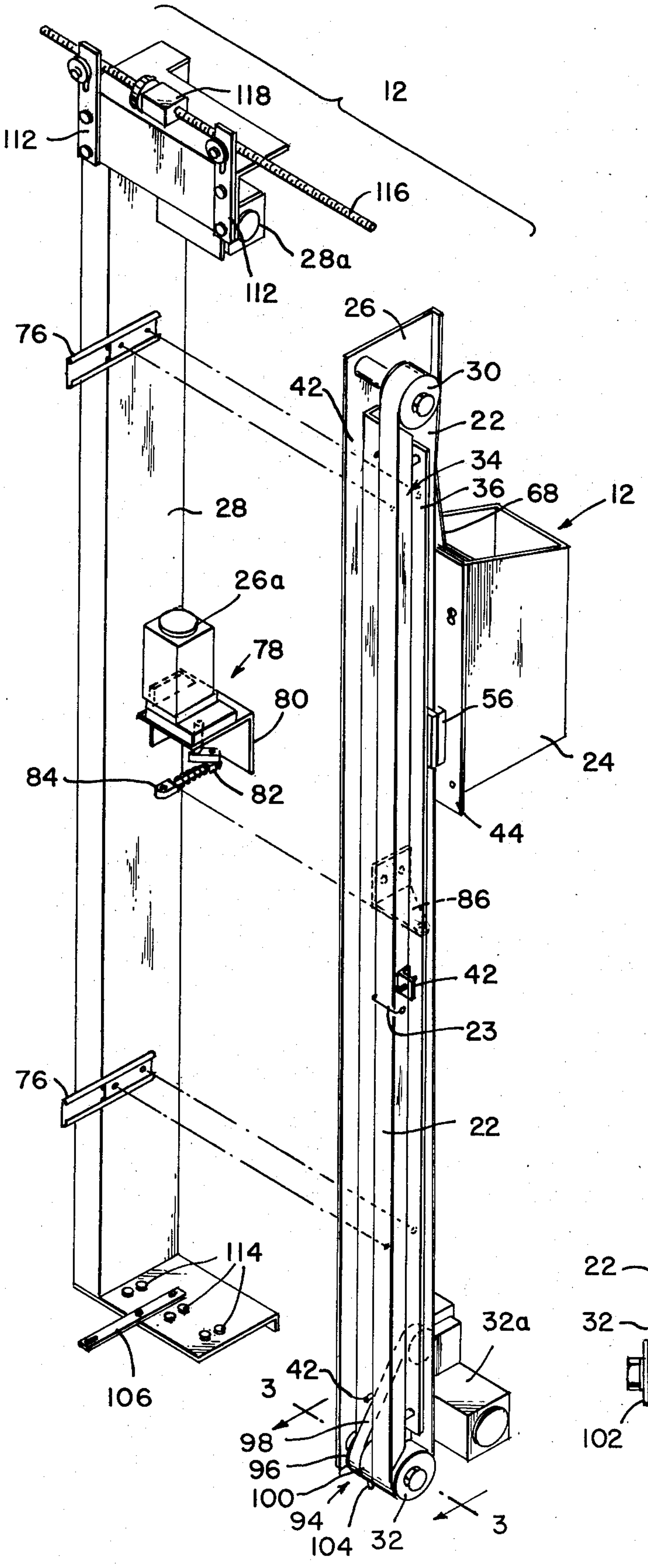
FIG. 2 is an exploded view in perspective showing selected features of the present invention.

Adhesive dispenser 24 is mounted to transfer frame 26 by a dispenser mounting bracket 44 (FIG. 2). Dispenser 24 is provided with key bolts 46 and positioning studs 48 (FIG. 8) on its frontside that interlock with appropriate apertures in bracket 44 so that it can be removed for refilling, cleaning, adjustment and so forth. Dispenser 24 constitutes an open-topped receptacle 50 for a hot melt adhesive that is equipped with an electrical resistance heating unit to maintain its adhesive contents at a preselected temperature. The dispenser is provided with an adhesive dispensing opening 52 (FIG. 9) providing communication from the receptacle's interior to an adhesive metering assembly 54 mounted on the frontside of dispenser 24.

The metering assembly 54 comprises a dispensing block 56 having a transverse passage 58 therethrough communicating with opening 52 (FIG. 9) and a metering insert 60 that is detachably mounted to block 56. Block 56 is provided with raised side lands 62 against which belt 22 is urged on the backside run as shown in FIG. 9. Thus, passage 58 opens into a well, defined by lands 62 on either side and insert 60 at the bottom. Insert 60 has a thickness less than the depth of the well so that adhesive filling the well during operation of the system will be extruded between belt 22 and insert 60 to a thickness equal to dimensional difference between the well depth and the insert's thickness. The thickness of adhesive thus metered onto belt 22 can be determined by the thickness of the insert used. A cushion 64 (FIG. 9) extends from the backside of aligning bar mounting bracket 36 under spring loading, against belt 22 with enough force to insure that no adhesive escapes the adhesive well to the side edges of belt 22. Consequently, a continuous strip of adhesive is deposited onto belt 22 of a width less than the belt width. In the embodiment illustrated in FIGS. 8 and 9, the overall width of block 56 is the same as the belt width and consequently the deposited adhesive strip has a width equal to the width of the adhesive well between raised lands 62. Passage 58 has a width also equal to the width of the adhesive well to insure that the well is not starved of adhesive during operation. The receptacle opening 52 is closed by a solenoid-operated slide valve 66.

Receptacle 50 is provided with an adhesive-return ramp 68 that extends upwardly from the receptacle's interior into scraping abutment with belt 22 on the backside run as shown in FIGS. 1 and 9. The belt contacting edge 70 of ramp 68 is beveled to provide essentially a line or knife edge scraping contact against belt 22. The ramp 68 is provided with side shoulders 72 that extend slightly beyond edge 70 such that the belt edges are confined by shoulders 72 at the point of belt contact with edge 70. Edge 70 is positioned frontwardly with respect to cushion 64 such that the backside run of belt 22 is deflected frontward to insure good scraping belt contact. The backside run of belt 22 is redirected below dispenser 24 by a deflection bracket 74 (FIG. 1) extending from the backside of aligning bar mounting bracket 36.

The adhesive distribution and application system thus far described provides certain unexpected and unique benefits. It has been discovered that the non-metallic belt enables the application of the adhesive at a lower temperature on the order of 350° F. vs. 410° F. for steel belts and still attain suitable bonding results. Furthermore, aligning bar 38 used as a belt heater can be maintained at a significantly lower temperature when a non-metallic, synthetic belt material is used.

Transfer frame 26 is mounted on horizontal roller guides 76 attached to carriage frame 28 (FIG. 2). Transfer frame 26 is shifted to and from a binding position on guides 76 by a motor-operated lost motion mechanism 78 (FIG. 2). This mechanism includes a motor mounting bracket 80 attached to carriage frame 28, a motor operated crank arm 82, a lost motion shift connection 84 pivotally connected to arm 82 and to shift bracket 86 attached to transfer frame 26 (FIG. 2). As shown in more detail in FIG. 4, lost motion connection 84 comprises a connecting rod 90 pivotally connected to bracket 86 and slidably connected to arm 82 and a compression spring 92 bearing against the slide connection with arm 82. As crank arm 82 revolves, transfer frame 26 will be shifted frontward and backward between pre-set limits. When one such limit is reached, crank arm 82 will continue to revolve with the consequence that lost motion results in the slide connection between rod 90 and arm 82 operating against spring 92 without binding and without further movement of the transfer frame 26.

Figure 3:
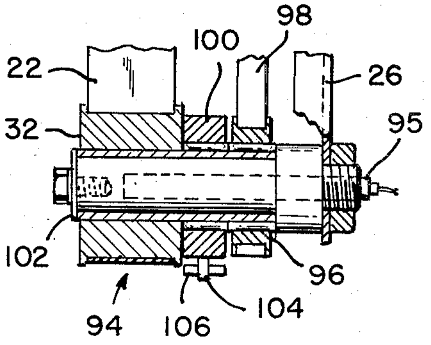
FIG. 3 is a cross-section view taken along the lines 3—3 of FIG. 2.
Figure 4:
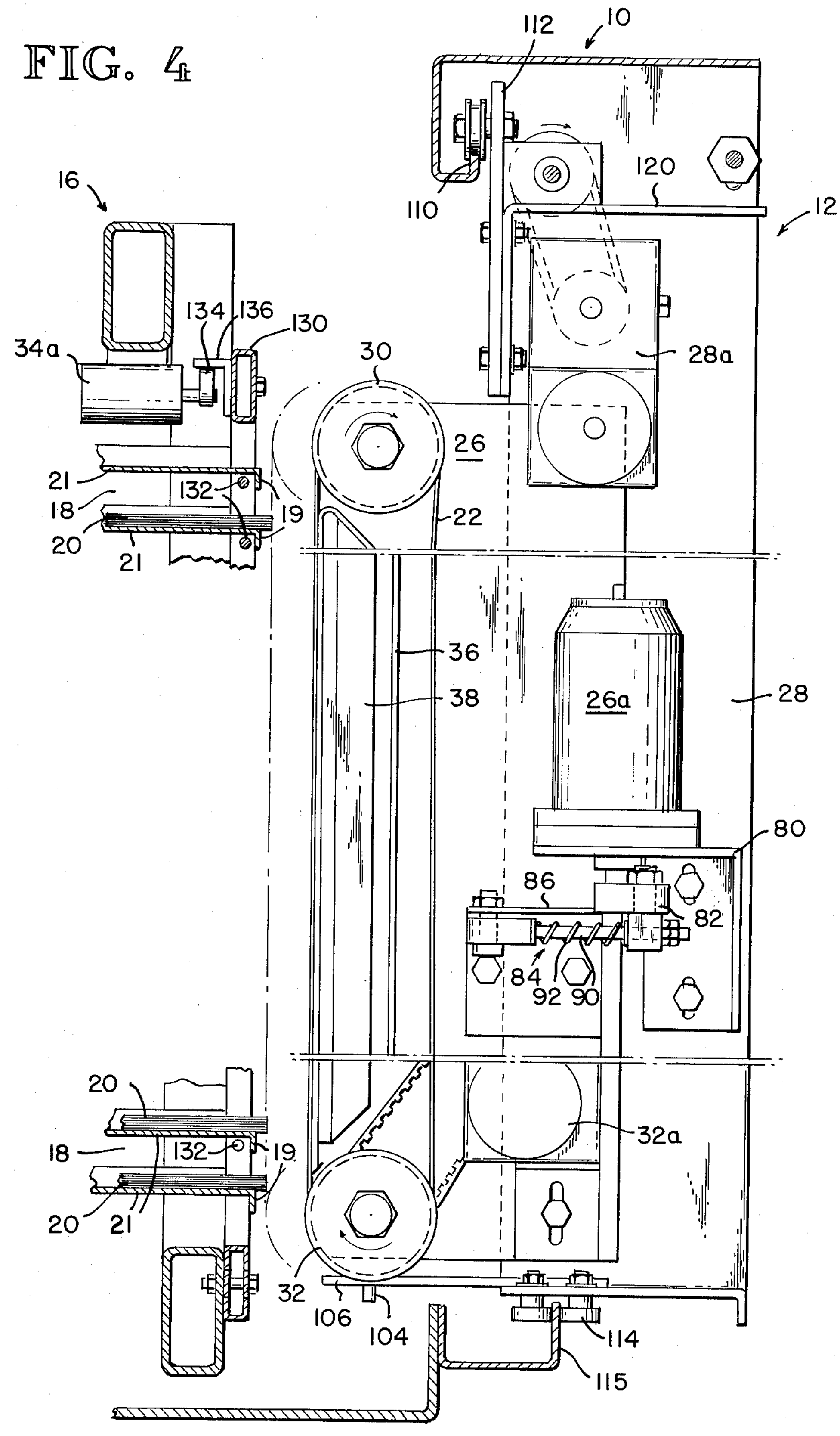
FIG. 4 is a partial side elevation view of the present invention.

Belt 22 is driven by motor driven pulley 32 through a clutch mechanism 94. As shown in FIG. 3, clutch mechanism 94 comprises a gear belt pulley 96 motor driven by a gear belt 98, belt pulley 32, and an intermediate roller clutch 100 containing bearings that rotate a drive sleeve 102 in one direction only. Drive sleeve 102 interconnects pulley 32, clutch 100 and pulley 96. Clutch 100 includes an actuating pin 104 that rides in a slot contained in the end of an actuating arm 106 (FIGS. 2, 3 and 4) attached to carriage frame 28. Referring to FIG. 4, when transfer frame 26 is shifted to the binding position (belt 22 shown in dotted line at the binding position), clutch 100 rotates counterclockwise relative to the other elements of clutch mechanism 94 and is in a disengaged condition. When transfer frame 26 is retracted from the binding position (to the position shown in solid line in FIG. 4), clutch 100 rotates clockwise and is in an engaged condition and consequently advances the belt a small amount (upward on the frontside run and downward on the backside run). In the FIG. 4 embodiment, the relative dimensions of the clutch mechanism 94 result in a one half inch advancement of belt 22 each time that transfer frame 26 is retracted from a binding position. This non-motorized advancement enables repositioning belt 22 so that a fresh portion of adhesive carried by belt 22 is located for binding contact on the next shift of transfer frame 26 to a binding position without having to actuate the motor drive for pulley 32. When the motor drive for pulley 32 is in operation, clutch 100 freewheels.

Carriage frame 28 is suspended from a track 110 (FIG. 4) on framework 10 by a pair of hanging roller mounts 112 and vertically aligned and guided at the bottom by pairs of guide roller assemblies 114 that track on a lower track 116 of framework 10. A spiral lead screw 116 is journalled in framework 110 and a motor-driven spiral block 118 is threaded onto screw 116. Block 118 is mounted on a bracket 120 attached to carriage frame 28 and serves to transport carriage frame 28 back and forth laterally across the face of receiver 16 as required. Framework 10 also mounts a polygonal indexing shaft 122 provided with rows of position-locating contacts 124 arranged on the shaft faces. Suitable microswitches 126 are mounted by bracket 120 with their contact arms arranged to contact the indexing shaft faces such that the position-locating contacts 124 are contacted in a preselected manner to control the operation of the motor-driven lead screw block 118 and thus to control the lateral shifting of the carriage frame 28 from one binding position to another along the face of receiver 16.

Sheet set edge clamping mechanism 14 mounted by framework 10 as shown in FIGS. 1 and 4 comprises a rectangular frame 130, the vertical sides of which track in guideways provided by framework 10, and a plurality of clamping rods 132 that extend across the receiver compartments 18 (one per compartment) from side to side of frame 130. The top bar of frame 130 is contacted by a motor-driven cam 134 by way of angle bracket 136 and is raised and lowered depending upon the position of cam 134. The clamping rods ride in slots provided in the vertical sides of frame 130 and are held either in a non-clamping condition as shown in FIG. 4 or a clamping condition as shown in FIG. 7, depending on the position of frame 130 as dictated by cam 134.

The system of the present invention, when operated in conjunction with a sheet receiver 10 such as depicted in FIG. 1, would function as described hereinafter. Sheets of paper would have been delivered to the receiver and aligned with their edges-to-be-bound abutting bars 20. These sheets would form one or more sheet sets 20, one set per receiver compartment 18. The adhesive heating element of the binder would have been actuated to melt the adhesive in dispenser 24 and to maintain the adhesive at a preselected operating temperature. Additional heating elements located within clutch belt drive mechanism 94, such as element 95 shown in FIG. 3, and located within belt aligning bar 38, such as element 39 shown in FIG. 6, could be activated to heat belt 22 and maintain molten adhesive on belt 22 at a preselected temperature during system operation. Typically the upper left hand corner of the sheet sets 20 would be located at position L of FIG. 1 and the carriage frame 28 would thus be indexed to the left until belt 22 is juxtapositioned adjacent the sheet set edges at position L. Motor-driven belt drive pulley 32 is actuated to drive the belt 22 downward on the backside run past dispenser 24 to deposit a continuous strip of adhesive onto belt 22 that would extend from dispenser 24 down around pulley 32 and up along the frontside run to the uppermost receiver compartment that contains a sheet set. Motor-driven cam 134 drops frame 130 to position the clamping rods 132 onto the tops of the sheet sets 20 and binding is ready to begin.

Motor-driven transfer frame 26 shifts frontward, motor-driven pulley 32 having ceased revolution so that adhesive-laden belt 22 is stationary, until belt-aligning stops 42 contact the front faces 19 of compartment-defining trays 21. The stops 42 are set to abut tray faces 19 at a point where the frontside run of belt 22 barely clears the sheet set edges, yet is close enough that the adhesive carried by belt 22 spans the gap and contacts the sheet set edges. The three-point positioning of the belt-aligning mechanism against the receiver as thus described centers the frontside run of belt 22 so that it is parallel with the sheet set edge plane. This is accomplished by automatically aligning the belt support bar 38 longitudinally and laterally with the sheet set edge plane as binding contact between the adhesive and the sheet set edges occurs. Transfer frame 26 is then retracted from the dotted line binding position shown in FIG. 4 to the retracted solid line position shown in FIG. 4. As belt 22 is withdrawn from the sheet edges, any tendency of the belt to pull away from bar 38 and remain adhered to the sheet edges is eliminated by the presence of a belt retaining wire 23 (FIGS. 2 and 6) mounted by bar 38 and extending around the frontside run of belt 22 at about the midpoint of the frontside run. As transfer frame 26 retracts, belt drive clutch mechanism 94 advances the belt to juxtapose fresh portions of adhesive on the frontside run into sheet edge binding positions.

Carriage frame 28 is then indexed rightward with respect to FIG. 1 as dictated by the rotary position of indexing rod 122 vis-a-vis microswitches 126 by motor-driven lead screw block 118 to the next binding position. The binding assembly may be thus indexed to provide binding at one location or any other number of locations to provide the desired length of sheet set bound edges. The aligning bars 20 are skipped in any binding operation, but except for the spaces occupied by these bars 20, the entire spine length of the sheet sets may be bound if desired. Upon indexing to the next binding position, transfer frame 26 is shifted frontward as above-described and the sequence repeats itself.

If the thicknesses of the sheet sets are beyond a predetermined limit, there will be insufficient fresh adhesive left on the frontside run of belt 22 to provide for another binding sequence with only an incremental advance of belt 22 by clutch mechanism 94. Therefore, in that event, motor-driven pulley 32 will be actuated to drive belt 22 around until a continuous strip of adhesive is once again presented along the frontside run to accomplish the desired binding. As belt 22 is recycled, as it were, adhesive remaining on belt 22 on the backside run will be scraped off onto ramp 68 and returned to dispenser 24 for reuse. In connection with the operation of dispenser 24, solenoid operated gate valve 66 opens to permit release of adhesive only when motor-driven pulley 32 is driving belt 22 past the adhesive dispensing block 56. When binding is complete, motor-driven cam 134 raises frame 30 releasing the bound sheet sets for removal from the receiver.

Figure 5:
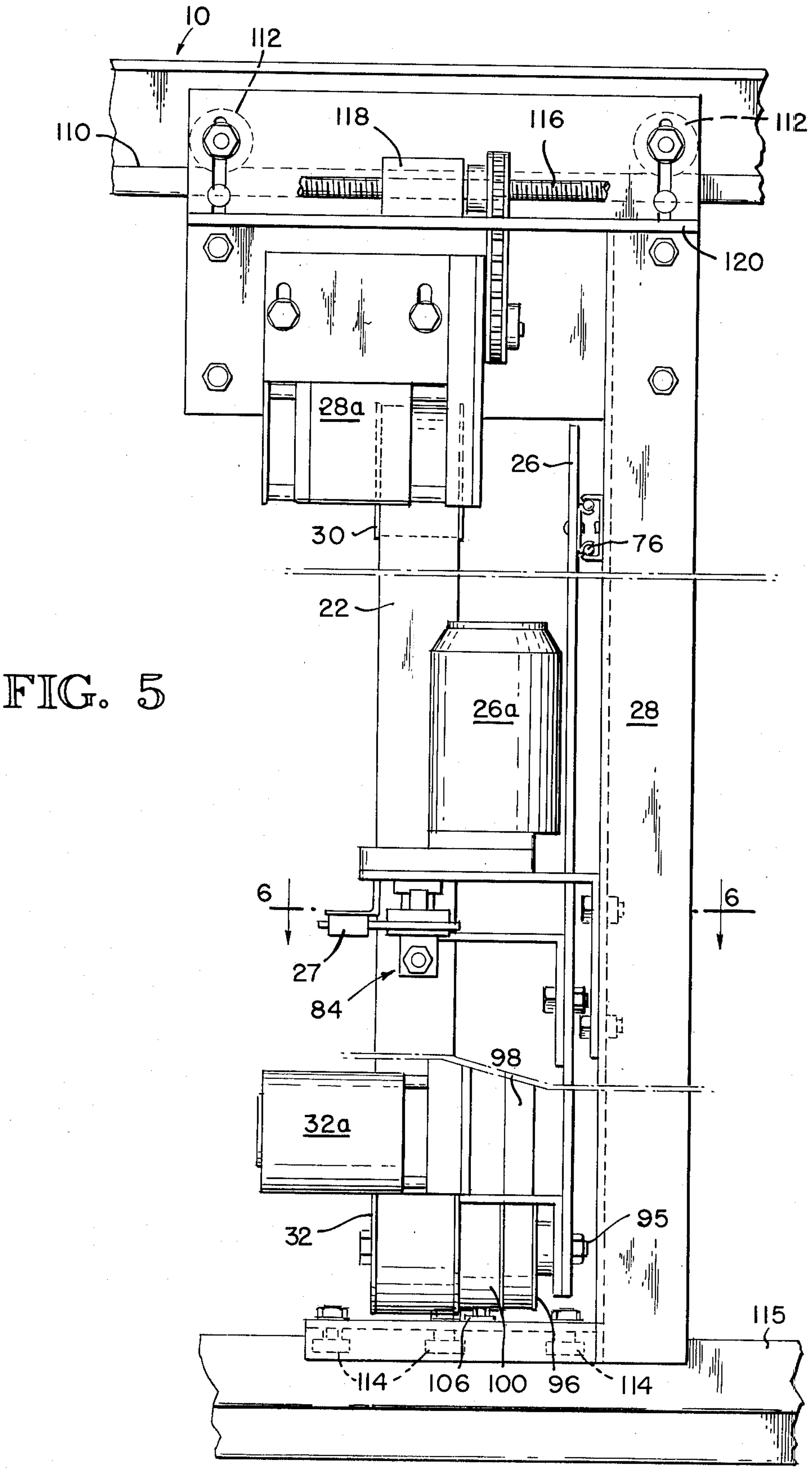
FIG. 5 is a partial backside elevation view of the present invention.

In connection with the shifting of transfer frame 26, frontside and backside limit switches 27 (FIGS. 1 and 5) may be mounted for actuation by crank arm 82 to instigate the sequence of events above-described with respect to the binding operation, belt advancement and recycling, and binding position indexing. Appropriate electrical and electronic control circuitry may be conveniently installed on carriage frame 28 for sequencing and control of the various operations described. Motors 32*a*, 26*a*, 28*a* and 34*a* are provided along with appropriate speed-reducing assemblies to operate belt advancement, transfer frame shifting, carriage frame shifting, and sheet set clamping as above described.

While the preferred embodiment of this invention has been illustrated and described herein, it should be understood that variations will become apparent to one skilled in the art. Accordingly, the invention is not to be limited to the specific embodiment illustrated and described herein and the true scope and spirit of the invention are to be determined by reference to the appended claims.

We claim:

1. Adhesive binding apparatus for edge binding multiple sets of sheet material held in a stack of multiple trays comprising:

adhesive application means including a movable adhesive transfer belt having a frontside facing the multiple trays and aligned edges of the multiple sets of sheet material to be bound and a backside, the transfer belt movable between a retracted position out of contact with the edges of the multiple sets of sheet material and an adhesive application position for transfer of adhesive on the belt onto the edges of the sets of the sheet material, an adhesive dispenser for depositing adhesive on the transfer belt, means mounting the belt for transfer between the retracted and the adhesive application positions, a belt aligning bar, and means connected to the belt aligning bar which, when the belt is moved from the retracted position to the adhesive application position, contact the front surface of the trays holding the sets of sheet material to align the belt aligning bar and the frontside run of the belt so that they are parallel to the front surface of the trays and to a plane extending through the edges of each of the multiple sets of sheet material to be bound.

2. The adhesive binding apparatus of claim 9, wherein the belt aligning bar extends along a portion of the length of and in contact with the backside of the belt, and wherein the alignment means includes adjustable belt alignment stops positioned along the length of the belt aligning bar and extending beyond the plane of the frontside surface of the transfer belt coated with adhesive, so that when the belt is moved from the retracted position to the adhesive application position the alignment stops contact the front surface of the trays holding the sets of sheet material to center the belt aligning bar and the frontside run of the belt.

3. The adhesive binding apparatus of claim 2, wherein the belt aligning bar includes heating means therein to maintain the adhesive coated on the transfer belt at a preselected operating temperature.

4. The adhesive coating apparatus of claim 2, wherein the adjustable belt aligning stops are positioned at spaced intervals along the frontside run of the belt and the stops adjusted so that the frontside run of the belt clears the edges of the sheets to be bound, yet is close enough thereto that adhesive deposited on the transfer belt contacts the edges of the sheets to be bound.

5. The adhesive binding apparatus of claim 4, wherein the adjustable belt aligning stops are connected to the belt aligning bar and the belt aligning bar is mounted so that when the stops contact the trays the belt aligning bar is automatically positioned to align the belt in contact therewith parallel to the plane extending through the edges of each of the multiple sets of sheet material to be bound.

6. The adhesive binding apparatus of claim 1, wherein the adhesive belt is fabricated of a non-metallic synthetic fabric having low elongation characteristics, the fabric belt enabling the adhesive to be metered onto the transfer belt at a lower temperature without sacrificing the bonding characteristics of the adhesive.

7. The adhesive binding apparatus of claim 1, including transfer belt drive means for incrementally advancing the belt between applications of adhesive to the edges of the sets of sheet material to be bound to position fresh portions of adhesive for binding further edges without the necessity of advancing the transfer belt through a complete revolution.

8. The adhesive binding apparatus of claim 1, wherein the adhesive transfer belt is an endless belt trained about spaced rollers, at least one of such rollers including heating means therein to maintain the adhesive metered onto the belt at a preselected temperature.

9. The adhesive binding apparatus of claim 1, including means for indexing the adhesive binding apparatus from one binding position to a subsequent binding position to provide the desired length of sheet set bound edges.

* * * * *